United States Patent
Hughes et al.

(10) Patent No.: US 9,191,342 B2
(45) Date of Patent: *Nov. 17, 2015

(54) DATA MATCHING USING FLOW BASED PACKET DATA STORAGE

(71) Applicant: Silver Peak Systems, Inc., Santa Clara, CA (US)

(72) Inventors: David Anthony Hughes, Los Altos Hills, CA (US); John Burns, Los Altos, CA (US); Zhigang Yin, Mountain View, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,425

(22) Filed: Nov. 20, 2014

(65) Prior Publication Data

US 2015/0078397 A1      Mar. 19, 2015

Related U.S. Application Data

(63) Continuation of application No. 14/270,101, filed on May 5, 2014, now Pat. No. 8,929,380, which is a continuation of application No. 11/498,473, filed on Aug. 2, 2006, now Pat. No. 8,755,381.

(51) Int. Cl.
*H04L 12/28* (2006.01)
*H04L 12/56* (2006.01)
(Continued)

(52) U.S. Cl.
CPC ............ *H04L 49/901* (2013.01); *H04L 43/062* (2013.01); *H04L 45/745* (2013.01);
(Continued)

(58) Field of Classification Search
CPC ............ H04L 47/2483; H04L 45/7453; H04L 45/748; H04L 45/745; H04L 43/062; H04L 49/90; H04L 49/901; H04L 49/9057; H04L 49/9047; H04L 49/9094; G06F 17/30; G06F 17/30949; G06F 17/30097
USPC ..................... 370/395.32, 389, 392; 707/205; 711/216

See application file for complete search history.

(56) References Cited

U.S. PATENT DOCUMENTS 4,494,108 A   1/1985 Langdon, Jr. et al.
4,612,532 A   9/1986 Bacon et al.
(Continued)

FOREIGN PATENT DOCUMENTS

EP   1507353       2/2005
JP   H05-061964    3/1993
WO   WO0135226 A1  5/2001

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14 pages.
(Continued)

*Primary Examiner* — Hoang-Chuong Vu
(74) *Attorney, Agent, or Firm* — Carr & Ferrell LLP

(57) ABSTRACT

A system for matching data using flow based packet data storage includes a communications interface and a processor. A communications interface receives a packet between a source and a destination. The processor identifies a flow between the source and the destination based on the packet. The processor determines whether some of packet data of the packet indicates a potential match to data in storage using hashes. The processor then stores the data from the most likely data match and second most likely data match without a packet header in a block of memory in the storage based on the flow.

18 Claims, 8 Drawing Sheets

(51) Int. Cl.
*G06F 9/26* (2006.01)
*H04L 12/879* (2013.01)
*H04L 12/741* (2013.01)
*H04L 12/861* (2013.01)
*H04L 12/26* (2006.01)
*H04L 12/851* (2013.01)

(52) U.S. Cl.
CPC ............ *H04L47/2483* (2013.01); *H04L 49/90* (2013.01); *H04L 49/9047* (2013.01); *H04L 49/9057* (2013.01); *H04L 49/9094* (2013.01)

(56) References Cited

U.S. PATENT DOCUMENTS

| | | | |
|---|---|---|---|
| 5,023,611 A | 6/1991 | Chamzas et al. | |
| 5,243,341 A | 9/1993 | Seroussi et al. | |
| 5,307,413 A | 4/1994 | Denzer | |
| 5,357,250 A | 10/1994 | Healey et al. | |
| 5,359,720 A | 10/1994 | Tamura et al. | |
| 5,373,290 A | 12/1994 | Lempel et al. | |
| 5,483,556 A | 1/1996 | Pillan et al. | |
| 5,532,693 A | 7/1996 | Winters et al. | |
| 5,592,613 A | 1/1997 | Miyazawa et al. | |
| 5,611,049 A | 3/1997 | Pitts | |
| 5,627,533 A | 5/1997 | Clark | |
| 5,635,932 A | 6/1997 | Shinagawa et al. | |
| 5,652,581 A | 7/1997 | Furlan et al. | |
| 5,659,737 A | 8/1997 | Matsuda | |
| 5,675,587 A | 10/1997 | Okuyama et al. | |
| 5,710,562 A | 1/1998 | Gormish et al. | |
| 5,748,122 A | 5/1998 | Shinagawa et al. | |
| 5,754,774 A | 5/1998 | Bittinger et al. | |
| 5,802,106 A | 9/1998 | Packer | |
| 5,805,822 A | 9/1998 | Long et al. | |
| 5,883,891 A | 3/1999 | Williams et al. | |
| 5,903,230 A | 5/1999 | Masenas | |
| 5,955,976 A | 9/1999 | Heath | |
| 6,000,053 A | 12/1999 | Levine et al. | |
| 6,003,087 A | 12/1999 | Housel, III et al. | |
| 6,054,943 A | 4/2000 | Lawrence | |
| 6,081,883 A | 6/2000 | Popelka et al. | |
| 6,175,944 B1 | 1/2001 | Urbanke et al. | |
| 6,295,541 B1 | 9/2001 | Bodnar et al. | |
| 6,308,148 B1 | 10/2001 | Bruins et al. | |
| 6,311,260 B1 | 10/2001 | Stone et al. | |
| 6,339,616 B1 | 1/2002 | Kovalev | |
| 6,374,266 B1 | 4/2002 | Shnelvar | |
| 6,434,662 B1 | 8/2002 | Greene et al. | |
| 6,438,664 B1 | 8/2002 | McGrath et al. | |
| 6,452,915 B1 | 9/2002 | Jorgensen | |
| 6,489,902 B2 | 12/2002 | Heath | |
| 6,587,985 B1 | 7/2003 | Fukushima et al. | |
| 6,618,397 B1 | 9/2003 | Huang | |
| 6,633,953 B2 | 10/2003 | Stark | |
| 6,643,259 B1 | 11/2003 | Borella et al. | |
| 6,650,644 B1 | 11/2003 | Colley et al. | |
| 6,653,954 B2 | 11/2003 | Rijavec | |
| 6,667,700 B1 | 12/2003 | McCanne et al. | |
| 6,674,769 B1 | 1/2004 | Viswanath | |
| 6,718,361 B1 | 4/2004 | Basani et al. | |
| 6,738,379 B1 | 5/2004 | Balazinski et al. | |
| 6,769,048 B2 | 7/2004 | Goldberg et al. | |
| 6,791,945 B1 | 9/2004 | Levenson et al. | |
| 6,856,651 B2 | 2/2005 | Singh | |
| 6,859,842 B1 | 2/2005 | Nakamichi et al. | |
| 6,862,602 B2 * | 3/2005 | Guha ................................ 1/1 |
| 6,910,106 B2 | 6/2005 | Sechrest et al. | |
| 6,963,980 B1 | 11/2005 | Mattsson | |
| 6,968,374 B2 | 11/2005 | Lemieux et al. | |
| 6,978,384 B1 | 12/2005 | Milliken | |
| 7,007,044 B1 | 2/2006 | Rafert et al. | |
| 7,020,750 B2 | 3/2006 | Thiyagaranjan et al. | |
| 7,035,214 B1 | 4/2006 | Seddigh et al. | |
| 7,047,281 B1 | 5/2006 | Kausik | |
| 7,069,342 B1 | 6/2006 | Biederman | |
| 7,110,407 B1 | 9/2006 | Khanna | |
| 7,111,005 B1 | 9/2006 | Wessman | |
| 7,113,962 B1 | 9/2006 | Kee et al. | |
| 7,120,666 B2 | 10/2006 | McCanne et al. | |
| 7,145,889 B1 | 12/2006 | Zhang et al. | |
| 7,197,597 B1 | 3/2007 | Scheid et al. | |
| 7,200,847 B2 | 4/2007 | Straube et al. | |
| 7,215,667 B1 | 5/2007 | Davis | |
| 7,242,681 B1 | 7/2007 | Van Bokkelen et al. | |
| 7,243,094 B2 | 7/2007 | Tabellion et al. | |
| 7,266,645 B2 | 9/2007 | Garg et al. | |
| 7,278,016 B1 | 10/2007 | Detrick et al. | |
| 7,318,100 B2 | 1/2008 | Demmer et al. | |
| 7,366,829 B1 | 4/2008 | Luttrell et al. | |
| 7,380,006 B2 | 5/2008 | Srinivas et al. | |
| 7,383,329 B2 | 6/2008 | Erickson | |
| 7,383,348 B2 | 6/2008 | Seki et al. | |
| 7,388,844 B1 | 6/2008 | Brown et al. | |
| 7,389,357 B2 | 6/2008 | Duffie, III et al. | |
| 7,389,393 B1 | 6/2008 | Karr et al. | |
| 7,417,570 B2 | 8/2008 | Srinivasan et al. | |
| 7,417,991 B1 | 8/2008 | Crawford et al. | |
| 7,420,992 B1 | 9/2008 | Fang et al. | |
| 7,428,573 B2 | 9/2008 | McCanne et al. | |
| 7,451,237 B2 | 11/2008 | Takekawa et al. | |
| 7,453,379 B2 | 11/2008 | Plamondon | |
| 7,454,443 B2 | 11/2008 | Ram et al. | |
| 7,457,315 B1 | 11/2008 | Smith | |
| 7,460,473 B1 | 12/2008 | Kodama et al. | |
| 7,471,629 B2 | 12/2008 | Melpignano | |
| 7,532,134 B2 | 5/2009 | Samuels et al. | |
| 7,555,484 B2 | 6/2009 | Kulkarni et al. | |
| 7,571,343 B1 | 8/2009 | Xiang et al. | |
| 7,571,344 B2 | 8/2009 | Hughes et al. | |
| 7,587,401 B2 | 9/2009 | Yeo et al. | |
| 7,619,545 B2 | 11/2009 | Samuels et al. | |
| 7,620,870 B2 | 11/2009 | Srinivasan et al. | |
| 7,624,446 B1 | 11/2009 | Wilhelm | |
| 7,630,295 B2 | 12/2009 | Hughes et al. | |
| 7,639,700 B1 | 12/2009 | Nabhan et al. | |
| 7,643,426 B1 | 1/2010 | Lee et al. | |
| 7,644,230 B1 | 1/2010 | Hughes et al. | |
| 7,676,554 B1 | 3/2010 | Malmskog et al. | |
| 7,698,431 B1 | 4/2010 | Hughes | |
| 7,702,843 B1 | 4/2010 | Chen et al. | |
| 7,714,747 B2 | 5/2010 | Fallon | |
| 7,746,781 B1 | 6/2010 | Xiang | |
| 7,764,606 B1 | 7/2010 | Ferguson et al. | |
| 7,827,237 B2 | 11/2010 | Plamondon | |
| 7,849,134 B2 | 12/2010 | McCanne et al. | |
| 7,853,699 B2 | 12/2010 | Wu et al. | |
| 7,873,786 B1 | 1/2011 | Singh et al. | |
| 7,941,606 B1 | 5/2011 | Pullela et al. | |
| 7,945,736 B2 | 5/2011 | Hughes et al. | |
| 7,948,921 B1 | 5/2011 | Hughes et al. | |
| 7,953,869 B2 | 5/2011 | Demmer et al. | |
| 7,970,898 B2 | 6/2011 | Clubb et al. | |
| 8,069,225 B2 | 11/2011 | McCanne et al. | |
| 8,072,985 B2 * | 12/2011 | Golan et al. .............. 370/395.32 |
| 8,095,774 B1 | 1/2012 | Hughes et al. | |
| 8,140,757 B1 | 3/2012 | Singh et al. | |
| 8,171,238 B1 | 5/2012 | Hughes et al. | |
| 8,209,334 B1 | 6/2012 | Doerner | |
| 8,225,072 B2 | 7/2012 | Hughes et al. | |
| 8,307,115 B1 | 11/2012 | Hughes | |
| 8,312,226 B2 | 11/2012 | Hughes | |
| 8,352,608 B1 | 1/2013 | Keagy et al. | |
| 8,370,583 B2 | 2/2013 | Hughes | |
| 8,386,797 B1 | 2/2013 | Danilak | |
| 8,392,684 B2 | 3/2013 | Hughes | |
| 8,442,052 B1 | 5/2013 | Hughes | |
| 8,473,714 B2 | 6/2013 | Hughes et al. | |
| 8,489,562 B1 | 7/2013 | Hughes et al. | |
| 8,565,118 B2 | 10/2013 | Shukla et al. | |
| 8,595,314 B1 | 11/2013 | Hughes | |
| 8,613,071 B2 | 12/2013 | Day et al. | |
| 8,700,771 B1 * | 4/2014 | Ramankutty et al. ......... 709/225 |
| 8,706,947 B1 | 4/2014 | Vincent | |

(56) References Cited

U.S. PATENT DOCUMENTS

| | | |
|---|---|---|
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,811,431 B2 | 8/2014 | Hughes |
| 8,885,632 B2 | 11/2014 | Hughes et al. |
| 8,929,380 B1 | 1/2015 | Hughes et al. |
| 8,929,402 B1 | 1/2015 | Hughes |
| 8,930,650 B1 | 1/2015 | Hughes et al. |
| 2001/0054084 A1 | 12/2001 | Kosmynin |
| 2002/0007413 A1 | 1/2002 | Garcia-Luna-Aceves et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0046572 A1 | 3/2003 | Newman et al. |
| 2003/0123481 A1 | 7/2003 | Neale et al. |
| 2003/0123671 A1 | 7/2003 | He et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0235119 A1 | 10/2005 | Sechrest et al. |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0174428 A1 | 7/2007 | Lev Ran et al. |
| 2007/0195702 A1 | 8/2007 | Yuen et al. |
| 2007/0198523 A1 | 8/2007 | Hayim |
| 2007/0226320 A1 | 9/2007 | Hager et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0095060 A1 | 4/2008 | Yao |
| 2008/0133536 A1 | 6/2008 | Bjorner et al. |
| 2008/0184081 A1 | 7/2008 | Hama et al. |
| 2008/0205445 A1 | 8/2008 | Kumar et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0313318 A1 | 12/2008 | Vermeulen et al. |
| 2008/0320151 A1 | 12/2008 | McCanne et al. |
| 2009/0024763 A1 | 1/2009 | Stepin et al. |
| 2009/0060198 A1 | 3/2009 | Little |
| 2009/0063696 A1 | 3/2009 | Wang et al. |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0234966 A1 | 9/2009 | Samuels et al. |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |

(56) References Cited

U.S. PATENT DOCUMENTS

| | | |
|---|---|---|
| 2010/0225658 A1 | 9/2010 | Coleman |
| 2010/0246584 A1 | 9/2010 | Ferguson et al. |
| 2010/0290364 A1 | 11/2010 | Black |
| 2010/0318892 A1 | 12/2010 | Teevan et al. |
| 2011/0002346 A1 | 1/2011 | Wu |
| 2011/0022812 A1 | 1/2011 | van der Linden et al. |
| 2011/0154329 A1 | 6/2011 | Arcese et al. |
| 2011/0219181 A1 | 9/2011 | Hughes et al. |
| 2011/0276963 A1 | 11/2011 | Wu et al. |
| 2012/0036325 A1 | 2/2012 | Mashtizadeh et al. |
| 2012/0173759 A1 | 7/2012 | Agarwal et al. |
| 2012/0221611 A1 | 8/2012 | Watanabe et al. |
| 2012/0239872 A1 | 9/2012 | Hughes et al. |
| 2013/0044751 A1 | 2/2013 | Casado et al. |
| 2013/0080619 A1 | 3/2013 | Assuncao et al. |
| 2013/0086236 A1 | 4/2013 | Baucke et al. |
| 2013/0094501 A1 | 4/2013 | Hughes |
| 2013/0117494 A1 | 5/2013 | Hughes et al. |
| 2013/0121209 A1 | 5/2013 | Padmanabhan et al. |
| 2013/0263125 A1 | 10/2013 | Shamsee et al. |
| 2013/0282970 A1 | 10/2013 | Hughes et al. |
| 2014/0052864 A1 | 2/2014 | Van Der Linden et al. |
| 2014/0123213 A1 | 5/2014 | Vank et al. |
| 2014/0181381 A1 | 6/2014 | Hughes et al. |
| 2014/0379937 A1 | 12/2014 | Hughes et al. |

OTHER PUBLICATIONS

Singh et al. ; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, <http://www.lancache.com/slcdata.htm>.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st Intl. Conf. on Data Eng., Tokyo, Japan, Apr. 5-8, 2005, pp. 12.

Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.

Knutsson, Bjorn et al., "Transparent Proxy Signalling", Journal of Communications and Networks, vol. 3, No. 2, Jun. 2001.

Definition memory (n), Webster's Third New International Dictionary, Unabridged (1993), available at <http://lionreference.chadwyck.com> (Dictionaries/Webster's Dictionary). Not provided in IPR2013-00402 proceedings.

Definition appliance, 2c, Webster's Third New International Dictionary, Unabridged (1993), available at <http://lionreference.chadwyck.com> (Dictionaries/Webster's Dictionary). Not provided in IPR2013-00402 proceedings.

Newton, "Newton's Telecom Dictionary", 17th Ed., 2001, pp. 38, 201, and 714.

Silver Peak Systems, "The Benefits of Byte-level WAN Deduplication" (2008).

"Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls"" (available at http://www.businesswire.com/news/home/20050919005450/en/Silver-Peak-Systems-Delivers-Family-Appliances-Enterprise-Wide#.UVzkPk7u-1 (last visited Aug. 8, 2014))."

Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).

Tseng, Josh, "When accelerating secure traffic is not secure" (available at http://www.riverbed.com/blogs/whenaccelerati.html?&isSearch=true&pageSize=3&page=2 (last visited Aug. 8, 2014)).

Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)).

Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)).

Final Written Decision, Dec. 30, 2014, Inter Partes Review Case No. IPR2013-00403.

Final Written Decision, Dec. 30, 2014, Inter Partes Review Case No. IPR2013-00402.

\* cited by examiner

DATA MATCHING USING FLOW BASED PACKET DATA STORAGE

CROSS-REFERENCE TO RELATED APPLICATIONS

The present application is a continuation and claims the priority benefit of U.S. patent application Ser. No. 14/270,101, (now U.S. Pat. No. 8,929,380), filed May 5, 2014, issued Jan. 6, 2015 and entitled "Data Matching Using Flow Based Packet Data Storage," which is a continuation and claims the priority benefit of U.S. patent application Ser. No. 11/498,473 (now U.S. Pat. No. 8,755,381), filed Aug. 2, 2006, issued Jun. 17, 2014 and entitled "Data Matching Using Flow Based Packet Data Storage." The above-referenced applications are incorporated herein by reference in their entirety including all references cited therein.

BACKGROUND

1. Technical Field

The present invention relates generally to data storage and communications and more particularly to data matching using flow based packet data storage.

2. Description of Related Art

For transmission over communications networks, data has been organized into packets, frames, and cells. Bundling data into these packets, frames, and cells assists routers and switches in the communication network to handle a manageable amount of data. Large amounts of data such as files may be separated into hundreds of packets. Thus, messages such as data requests or data responses for these large amounts of data may also span over hundreds of packets. When packets get misordered or retransmitted, reassembling the packets into the messages can be difficult and time consuming.

In some situations, incoming data needs to be matched with data stored in memory. In one example, in order to prevent redundancy and reduce communication bandwidth, a request for data is matched with data stored in local memory and retrieved from the memory without transmitting the request for data to retrieve the data over the communications network. However, matching the data may be problematic when the packets for related data are stored in different locations in the memory.

A Transmission Control Protocol (TCP) stack does reassemble and sort out packets. The TCP stack does handle packets destined to a socket and then sequentially stores the packets from the socket in pages of memory. The TCP stack also strips the header of the packet and transfers the payload data of the packet to the applications in the application layer. Ethernet switches and IP routers also perform flow based queuing, where packets for a flow are stored in queues. The packets for a flow may be organized on the same page of memory or by linked lists.

These protocols, switches, and routers may have stored packets in memory based on a flow to solve different problems such as buffering and queuing. However, none of the prior art systems have stored the packets in memory based on flow to match data.

SUMMARY OF THE INVENTION

The invention addresses the above problems by providing data matching by using flow based packet data storage. A system for processing packets includes a communications interface and a processor. The communications interface receives a packet between a source and a destination. The processor identifies a flow between the source and the destination based on the packet. The processor determines whether some of packet data of the packet matches to storage data in storage using hashes. If the packet data does not match the storage data, the processor then stores the packet data in a block of memory in the storage based on the flow.

The storage may comprise short term memory and long term memory. The flow may comprise a session between a source and a destination. The block of memory may comprise a page of the contiguous memory. In some embodiments, the processor computes the hashes for the flow. The processor may also determine the hashes for the flow and store the hashes for the flow. The hashes can be rolling.

A method for processing packets includes the steps of receiving a packet between a source and a destination and identifying a flow between the source and the destination based on the packet. The method also includes the step of determining whether packet data of the packet matches to storage data in storage using hashes. The method also includes storing the packet data in a block of memory in the storage based on the flow and if the packet data does not match the storage data.

The system advantageously provides an organization of data in memory by flow for easier matching of data through hashes and retrieval of that data. By storing the packets for a flow in the same block of memory, accessing the data for the flow is easier than having different flows interleaved with each other in memory. Also, data can be matched to data in the flow regardless of how data may have been separated into packets. Thus, any issues with packet boundaries for data are eliminated.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A system for processing packets includes a communications interface and a processor. A communications interface receives a packet between a source and a destination. The processor identifies a flow between the source and the destination based on the packet. The processor determines whether some of packet data of the packet matches to storage data in storage using hashes. The processor then stores the packet data in a block of memory in the storage based on the flow and if the packet data does not match the storage data.

The system advantageously provides an organization of data in memory by flow for easier matching of data through hashes and retrieval of that data. By storing the packets for a flow in the same block of memory, accessing the data for the flow is easier than having different flows interleaved with each other in memory. Also, data can be matched to data in the flow regardless of how data may have been separated into packets. Thus, any issues with packet boundaries for data are eliminated. The system can handle different types of data requests and responses and still match data within the packets.

The system minimizes delay by storing packets in a flow on a packet-by-packet basis. Thus, higher throughput is realized because the system does not have to wait for the next packet in the flow. As soon as packets are received, the system determines where to store the packet and whether to store the packet.

Figure 1:
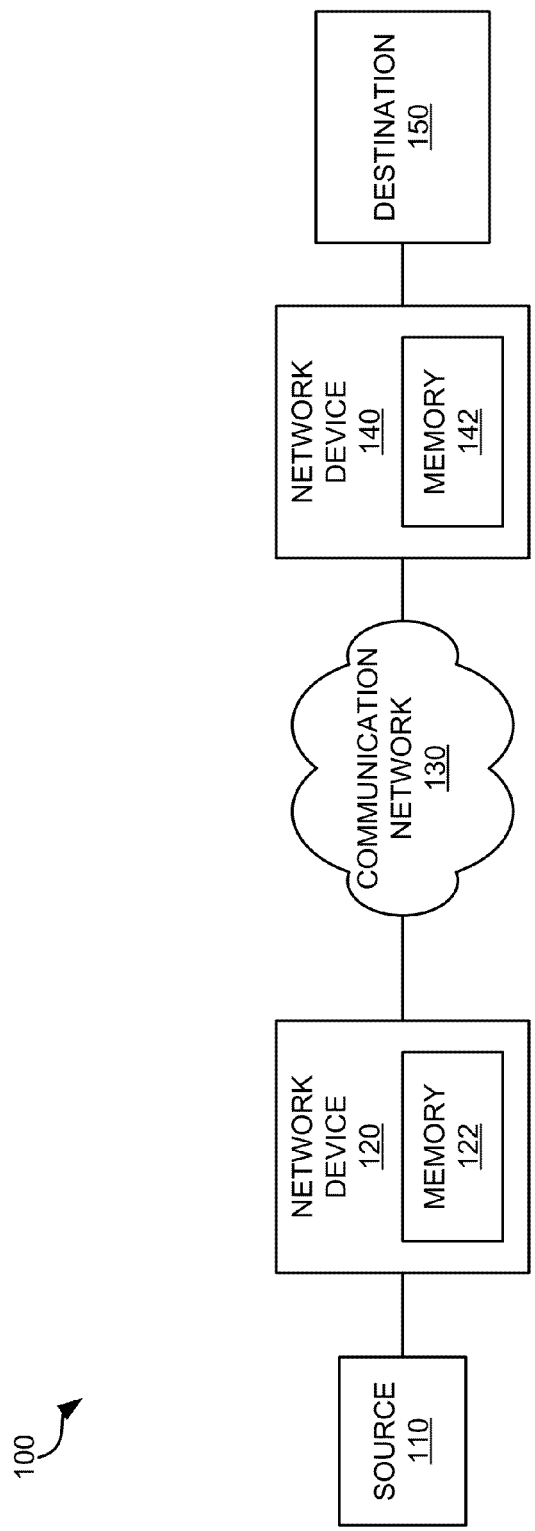
FIG. 1 is an illustration of a communications system in an exemplary implementation of the invention.

FIG. 1 depicts an illustration of a communications system 100 in an exemplary implementation of the invention. The communications system 100 includes a source 110, a network device 120, a communication network 130, a network device 140, and a destination 150. The source 110 is coupled to the network device 120, which includes a memory 122. The network device 120 is coupled to the communication network 130. The communication network 130 is coupled to the network device 140, which includes a memory 142. The network device 140 is coupled to the destination 150.

The embodiments in FIGS. 1-8 depict an example of packets being transmitted from the source 110 to the destination 150 through the network device 120, the communication network 130, and the network device 140. Other embodiments may include packets being transmitted from the destination 150 to the source 110. The network device 120 and the network device 140 may generate their own packets and be the source 110 and the destination 150. While there are numerous variations in where the packet is generated and transmitted to, the figures below describe one example of packet transmissions from the source 110 to the destination 150 for the sake of simplicity.

The network device 120 and the network device 140 are any device or system configured to process packets and exchange packets over the communication network 130. The configuration of the network device 120 is described in further detail below in FIG. 8. One example of the network device 120 is an appliance in a network memory architecture, which is described in U.S. patent application Ser. No. 11/202,697 (now U.S. Pat. No. 8,370,583) entitled "Network Memory Architecture for Providing Data Based on Local Accessibility" filed on Aug. 12, 2005 and issued on Feb. 5, 2013, which is hereby incorporated by reference.

Figure 2:
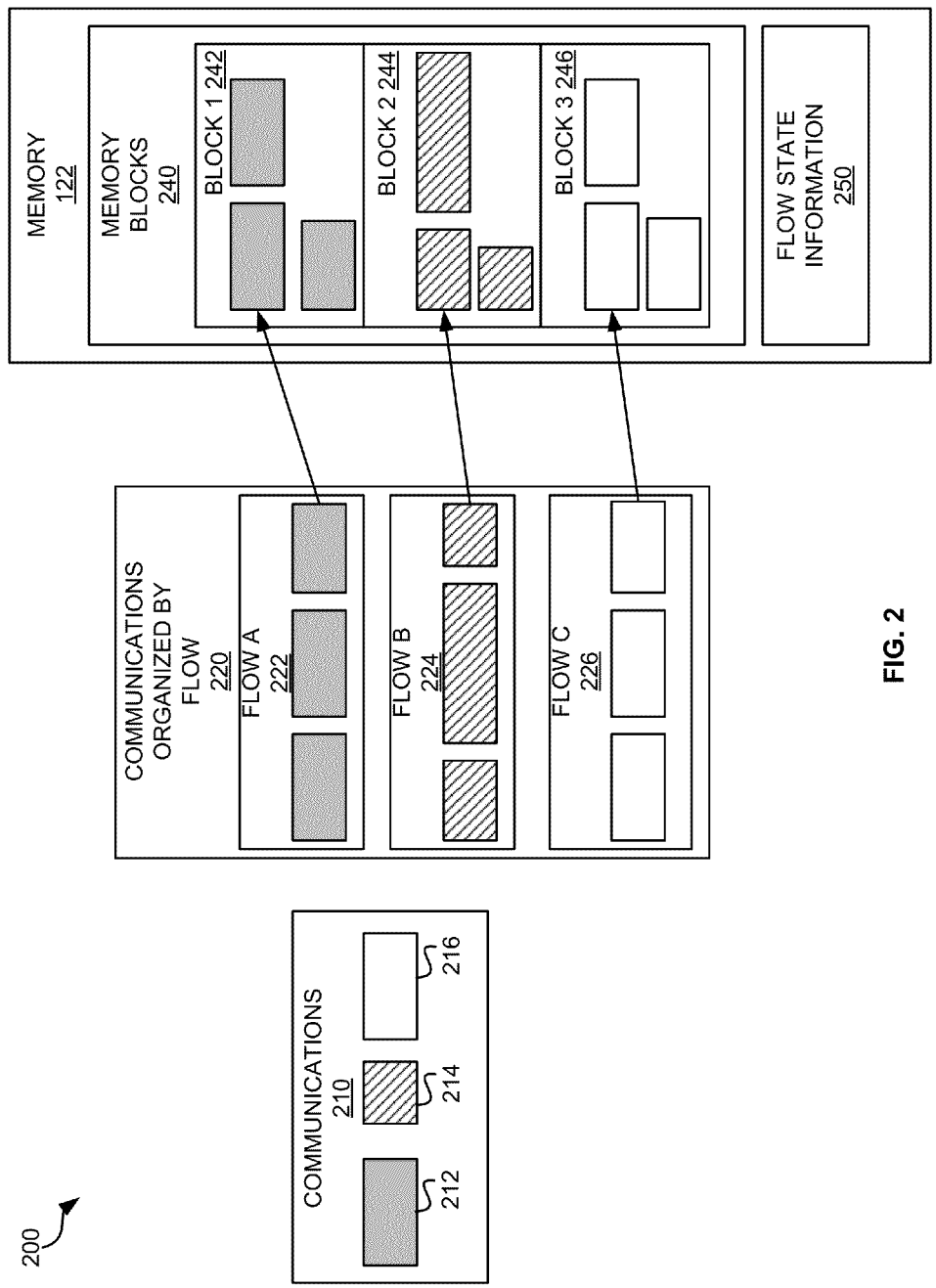
FIG. 2 is an illustration of communications in various forms in an exemplary implementation of the invention.

FIG. 2 depicts an illustration of communications in various forms in an exemplary implementation 200 of the invention. The communications 210 include messages 212, messages 214, and messages 216. Some example of the messages 212, messages 214, and messages 216 are data requests and responses.

The communications 220 organized by flow include the flow A 222, flow B 224, and flow C 226. A flow is a communications session between two devices over a communications network. One example of a flow is an Internet Protocol (IP) flow. In one example, the flow is uniquely identified by the source IP address, the destination IP address, the IP protocol, the source port, and the destination port. The packets for a flow are advantageously stored in a same block of memory for easy retrieval and matching.

The memory 122 includes memory blocks 240 and flow state information 250. The memory 122 may comprise Random Access Memory (RAM), disk drives, hard disks, optical disks, and any of a combination of these elements. The memory 122 may comprise two levels of memory. One level is a more temporary or short term memory such as RAM, and the other level is a more permanent or long term memory such as disk. Typically, the temporary memory has faster read and write access than the slower read and write access of permanent memory.

The memory blocks 240 include block 1 242, block 2 244, and block 3 246. The memory blocks 240 are blocks of contiguous memory. A block of memory is a contiguous section or portion of memory.

FIG. 2 depicts how flow A 222 is stored into block 1 242 of the memory blocks 240. Also, flow B 224 is stored into block 2 244 of the memory blocks 240, and flow C 226 is stored into block 3 246 of the memory blocks 240. FIG. 2 shows how communications 210 are organized into flows, and how the flows are organized into blocks of memory. The figures below describe how the packets in the flows are stored into a specific block of memory blocks 240 based on flow.

The flow state information 250 is any data or information that relate to the characteristics, status, or state of the flow.

Figure 3:
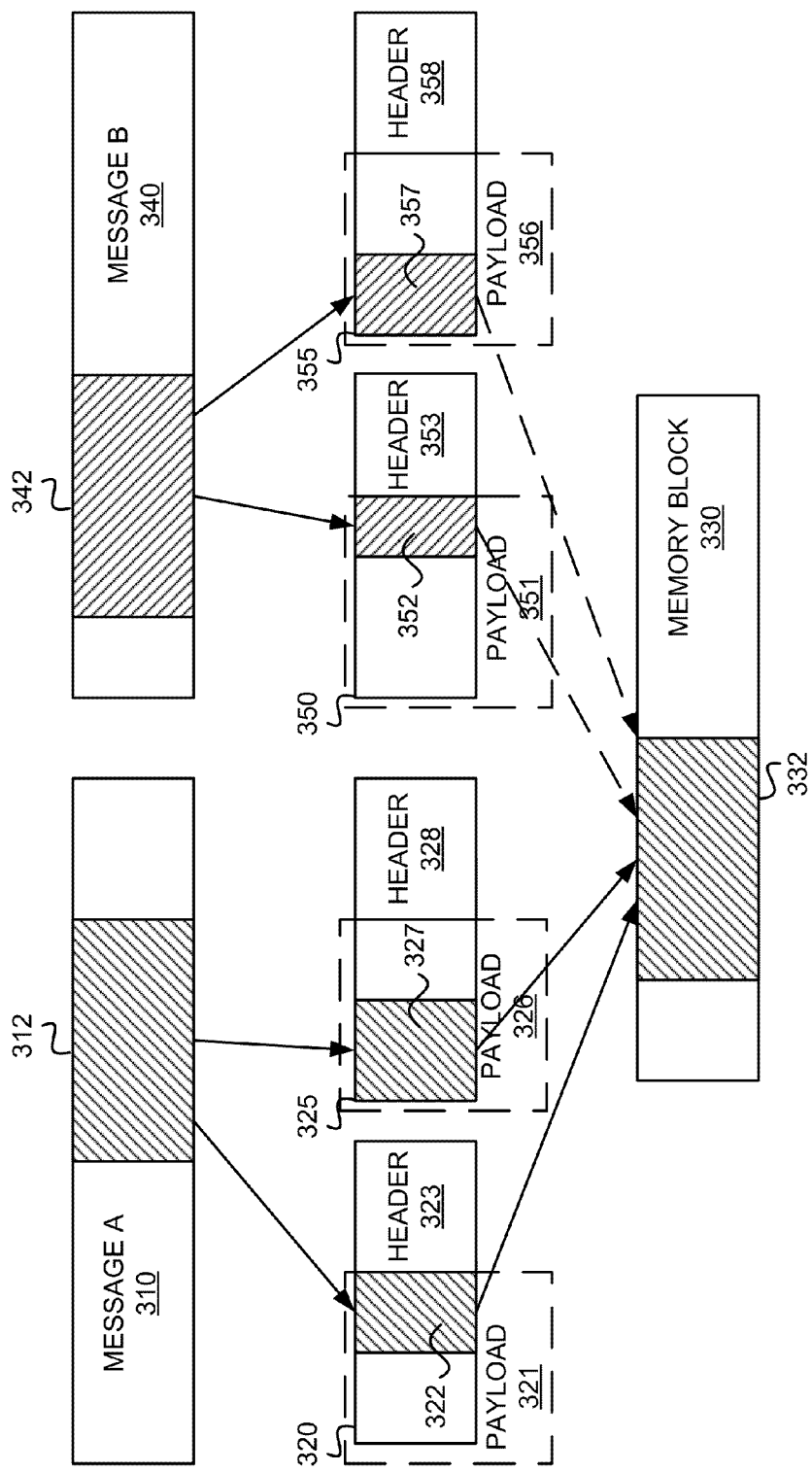
FIG. 3 is an illustration of messages, packets, and a block of memory that contain data in an exemplary implementation of the invention.

FIG. 3 depicts an illustration of messages, packets, and a block of memory that contain data in an exemplary implementation of the invention. A message A 310 contains data 312. The message A 310 is then separated into packets for communication. The message A 310 is delineated into packet A 320 and packet B 325. Only two packets for message A 310 are shown for the sake of simplicity. However, messages may be separated into numerous packets. The packet A 320 comprises a payload 321 and the header 323. The packet B 325 comprises a payload 326 and the header 328. The data 312 in message A 310 is separated into data 322 in the payload 321 of packet A 320 and data 327 in the payload 326 of packet B 325. As discussed above in FIG. 2, the data 322 and the data 327 are stored in a memory block 330 as data 332 without the headers 323 and 328. The data 332 is stored in the memory block 330 without any packet delineations so data with different packet boundaries can be matched to the data in the memory block 330.

Message B 340 includes data 342. The message B 340 also is then separated into packets for communication. The message B 340 is delineated into packet C 350 and packet D 355. The packet C 350 comprises a payload 351 and the header 353. The packet D 355 comprises a payload 356 and the header 358. The data 342 in message B 340 is separated into data 352 in the payload 351 of packet C 350 and data 357 in the payload 356 of packet D 355. Using hashes and storing states of hashes across packet boundaries as discussed in further detail below in FIGS. 4-6, the data 352 and the data 357 can then be compared with the data 332 for matching. Even though the data 312 is separated into different packet boundaries than data 342, the data 312 can still be matched with data 342 if identical.

Figure 4:
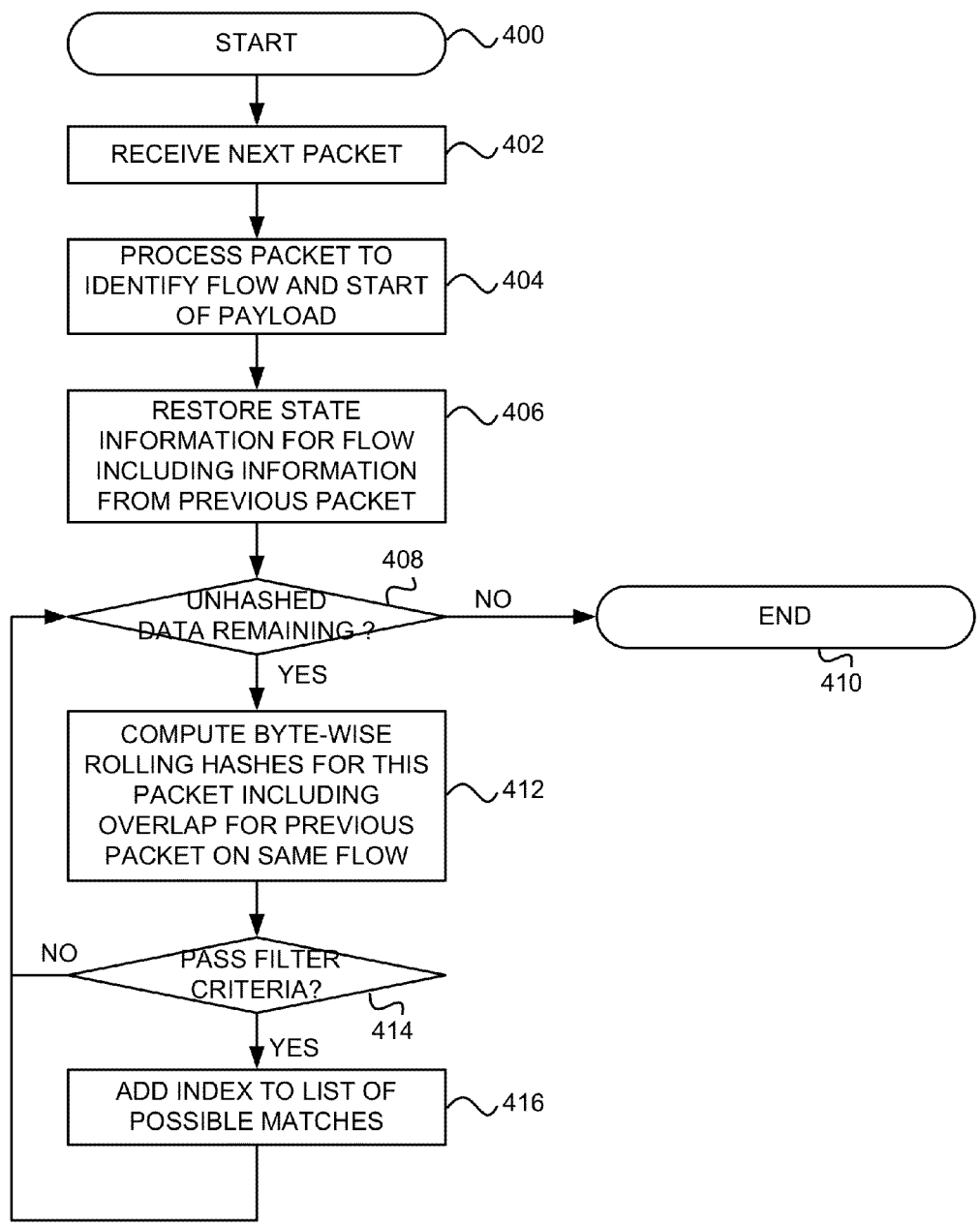
FIG. 4 is a flow chart for the network device that hashes data in an exemplary implementation of the invention.

FIG. 4 depicts a flow chart for the network device 120 that hashes data in an exemplary implementation of the invention. FIG. 4 begins in step 400. In step 402, the network device 120 receives the next packet. In step 404, the network device 120 processes the packet to identify the flow and the start of the payload. In step 406, the network device 120 restores the state information for the flow including information from the previous packet in the flow. The information from the previous packet in the flow may be hashes, partial hash states, or actual data from the previous packet.

In step 408, the network device 120 determines whether there is unhashed data remaining. If there is no unhashed data remaining, the process ends in step 410. If there is unhashed data remaining, the network device 120 computes byte-wise rolling hashes over packets in the same flow in step 412. A hash is a scheme for providing rapid access to data items which are distinguished by some key. These hashes provide a type of "fingerprinting" over the data to make matching the data easier. One example of a rolling hash is a checksum where the oldest byte in the window is subtracted and new bytes are added. The rolling hash may be over at least one packet. Thus, the rolling hash can run over packet boundaries. When the hash rolls over the end of a packet, the hash state or the remaining portion of the packet (e.g. the last 100 bytes of a packet) that has not been hashed can be saved and retrieved when the next sequential packet for the flow has been received. This hash or the remaining portion of the packet can be saved per flow and can be saved with the state information for the flow. The network device 120 may calculate the hash to the end of the packet.

In one example, cyclic redundancy check (CRC) is used for hashing, where one byte is added and one byte is taken off. CRC provides a stronger fingerprint (e.g. more collision resistant) than checksums. In another example, the hashes are based on the following equation:

$$\text{new hash} = \text{old hash} \times 2 \times P + \text{new data} \times Q;$$

where P and Q are constants.

In step 414, the network device 120 checks whether the filter criteria have been passed. The network device 120 may use fine and coarse hashes as filters. Fine and coarse hashes are described in further detail in U.S. patent application Ser. No. 11/202,697 (now U.S. Pat. No. 8,370,583) entitled "Network Memory Architecture for Providing Data Based on Local Accessibility" filed on Aug. 12, 2005 and issued on Feb. 5, 2013. If the filter criteria have not been passed, the process returns to step 408. If the filter criteria have been passed, the network device 120 adds the index to the list of possible matches in step 416 and returns to step 408.

Figure 5:
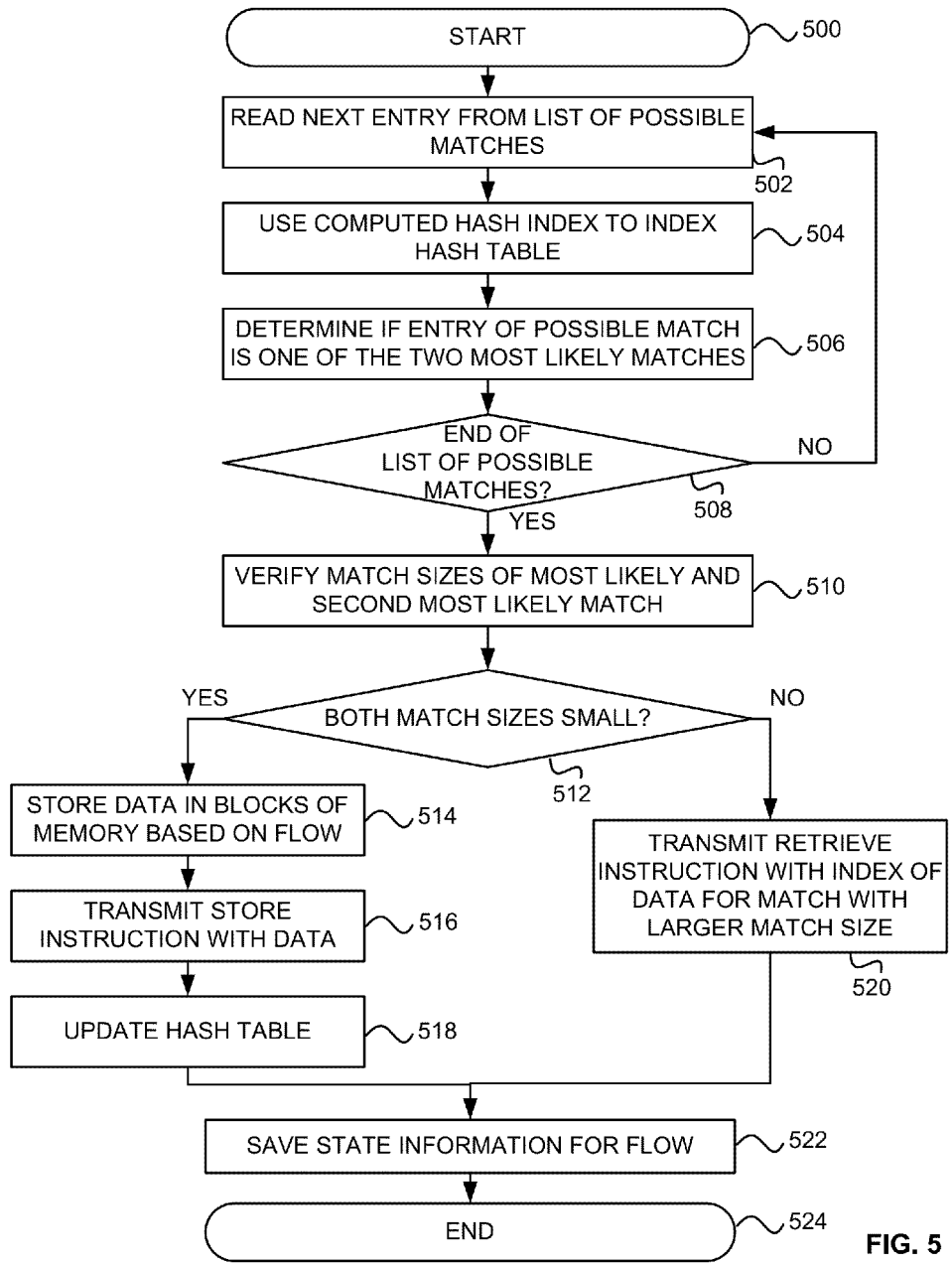
FIG. 5 is a flow chart for the network device that matches data in an exemplary implementation of the invention.

FIG. 5 depicts a flow chart for the network device 120 that matches data in an exemplary implementation of the invention. FIG. 5 begins in step 500. In step 502, the network device 120 reads the next entry from the list of possible matches. In step 504, the network device 120 uses the computed hash index to index a hash table. In step 506, the network device 120 checks whether the entry of a possible match is one of the two most likely matches. In determining the most likely match, the network device 120 may check a block of memory that some of the matches are pointing to. In step 508, the network device 120 checks whether the next entry is the end of the list of possible matches. If the next entry is not the end of the list of possible matches, the process returns to step 502.

If the next entry is at the end of the list of possible matches, the network device 120 verifies the match sizes of the most likely and the second most likely matches in step 510. The network device 120 then determines whether both match sizes are small in step 512. The network device 120 advantageously can match data using hashes regardless of how the data was delineated into different packet boundaries.

If both match sizes are small, the network device 120 stores the data in blocks of memory based on the flow in step 514. Thus, as packets are received, the network device 120 sorts and stores the packets by flow, which provides an organization of data by flow making matching the data by hashes easier. For example, writing and retrieving the data for a flow in one portion of memory is easier and faster than retrieving data for a flow that is scattered in various locations in the memory. In some embodiments that have two levels of memory such as RAM and disk, moving data in one portion of disk to RAM can especially save access time to the data. Step 514 is described in more detail below in FIG. 6.

The network device 120 also transmits a store instruction with the data in step 516. The store instruction causes the network device 140 to store the data in the memory 142 of the network device 140. In step 518, the network device 120 then updates the hash table before proceeding to step 522.

If at least one match size is not small, the network device 120 transmits a retrieve instruction with the index of the data for the match with the larger match size in step 520 before proceeding to step 522. The retrieve instruction causes the network device 140 to retrieve the data from its own memory 142. Thus, the data does not have to be transmitted over the communication network 130 but still can be accessed by the network device 140. The network device 120 saves the state information for the flow in step 522. FIG. 5 ends in step 524.

Once data is matched, the network device 120 may match subsequent data by requesting the next packet for the flow. The network device 120 can then iteratively (i.e., going on a "run") match data and request the next packet for the flow. For example, the network device 120 can match data in a big file until the end of the file. Since the data is stored sequentially by flow in the memory, the network device 120 can just read the next portion of data in the memory. Thus, the data can be coalesced or reconstituted and the one instruction such as a retrieve instruction or store instruction per one packet may be avoided. Store and retrieve instructions are described in further detail in U.S. patent application Ser. No. 11/202,697 (now U.S. Pat. No. 8,370,583) entitled "Network Memory Architecture for Providing Data Based on Local Accessibility" filed on Aug. 12, 2005 and issued on Feb. 5, 2013.

Figure 6:
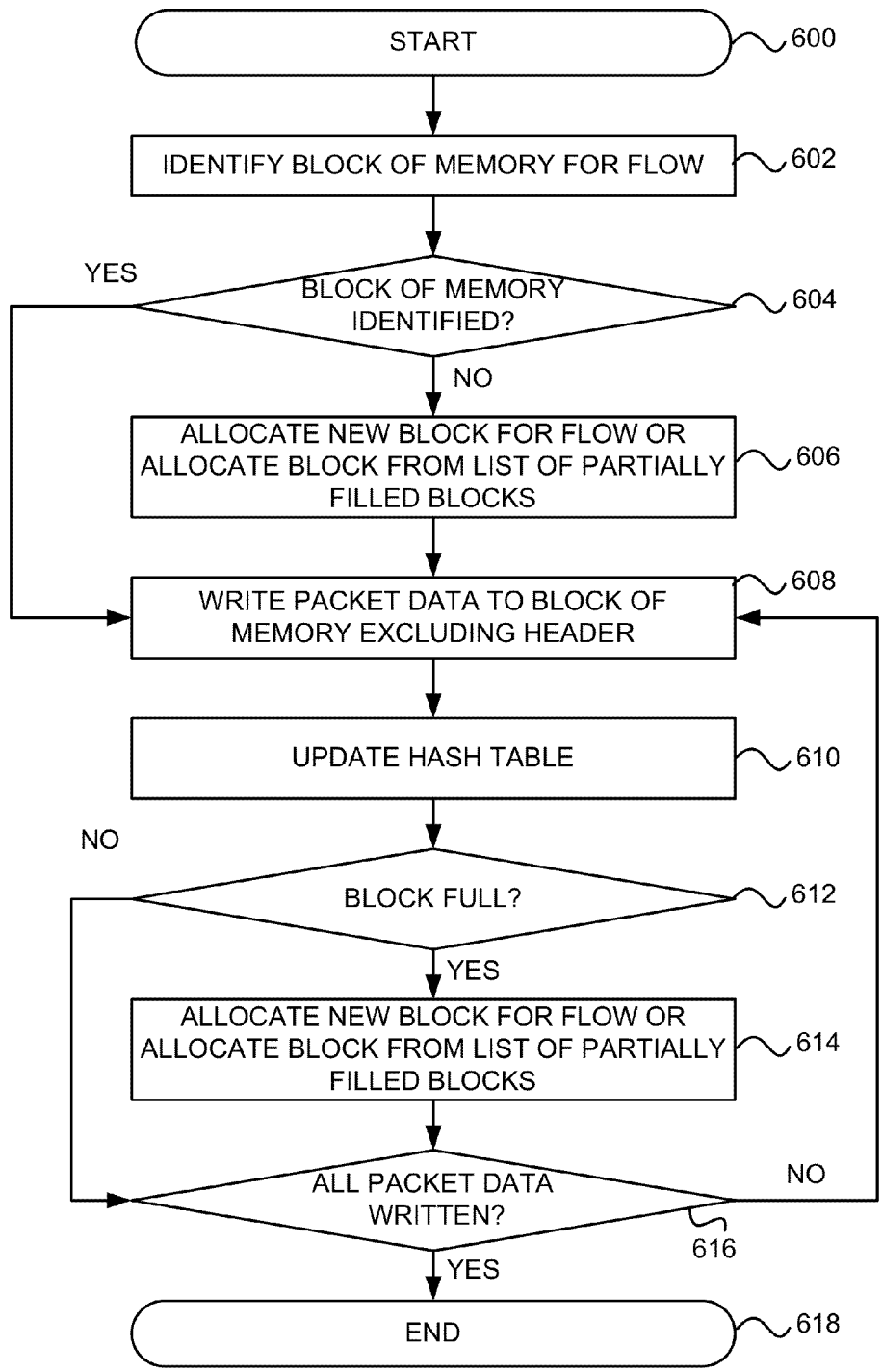
FIG. 6 is a flow chart for the network device that writes data in an exemplary implementation of the invention.

FIG. 6 depicts a flow chart for the network device that writes data in an exemplary implementation of the invention. FIG. 6 depicts a process for storing the data in memory as in step 512 of FIG. 5. FIG. 6 begins in step 600. In step 602, the network device 120 identifies the block of memory for the flow. In one example, the network device 120 checks a table of flows and locations of blocks of memory associated with the flow. In step 604, the network device 120 checks whether the block of memory is identified for the flow. If the block has been identified, the network device 120 proceeds to step 608. If the block has not been identified, the network device 120 allocates a new block of memory for the flow or allocates a block of memory from a list of partially filled blocks of memory in step 606. Initially, one flow can be assigned per block of memory. Once the number of flows exceeds the number of blocks of memory, two flows can be assigned per block of memory. Thus, multiple flows can be assigned per block of memory. In some embodiments, the partially filled blocks are reallocated on a Least Recently Used (LRU) basis.

In step 608, the network device 120 writes the packet data to the block of memory excluding the packet header. In step 610, the network device 120 updates the hash table. In step 612, the network device 120 checks whether the block of memory is full. If the block of memory is not full, the network device 120 proceeds to step 616. If the block of memory is full, the network device 120 allocates a new block of memory for the flow or allocates a block of memory from a list of partially filled blocks of memory in step 614. The block of memory does not have to be completely full. A threshold such as 90% full may be set up to indicate that the block of memory is full.

In step 616, the network device 120 checks whether all the packet data has been written. When the network device 120 determines that the flow finishes, the network device 120 can relinquish the block of memory for the flow, so another flow can use the block of memory. In some embodiments that have two levels of memory such as RAM and disk, when the RAM is first used, the block in the RAM is saved to disk. The network device 120 can relinquish the block of memory by adding the block of memory to the list of partially full blocks of memory. The network device 120 may determine that the flow has ended by a TCP reset or finish (FIN) indicator or another termination message that indicates an explicit ending for the flow. The network device 120 may also determine that the flow has ended for this matching technique when after a period of time (e.g., 10 seconds) there is no activity on the flow.

If all the packet data has not been written, the process returns to step 608 to write the remaining packet data. If all the packet data has been written, FIG. 6 ends in step 618.

Figure 7:
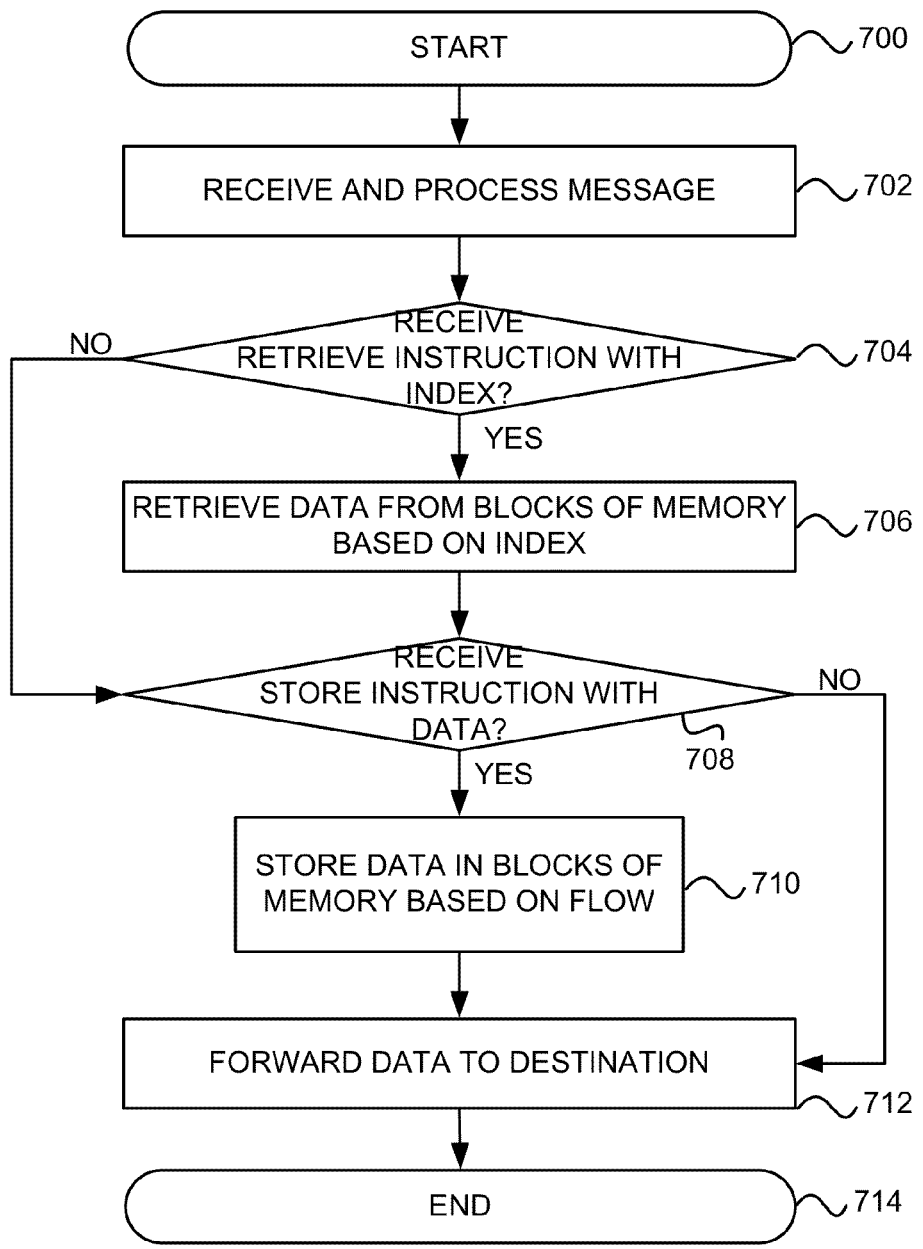
FIG. 7 is a flow chart for the network device that retrieves data in an exemplary implementation of the invention.

FIG. 7 depicts a flow chart for the network device that retrieves data in an exemplary implementation of the invention. FIG. 7 begins in step 700. In step 702, the network device 140 receives and processes a message. In step 704, the network device 140 checks whether a retrieve instruction with an index has been received. If a retrieve instruction with an index has not been received, the process continues to step 708. If a retrieve instruction has been received, the network device 140 retrieves the data from the blocks of memory based on the index in step 706.

In step 708, the network device 140 checks whether a store instruction with data has been received. If the store instruction with data has not been received, the process continues to step 712. If the store instruction with data has been received, the network device 140 stores the data in the blocks of memory based on the flow in step 710. In step 712, the network device 140 forwards the data to the destination. FIG. 7 ends in step 714.

Figure 8:
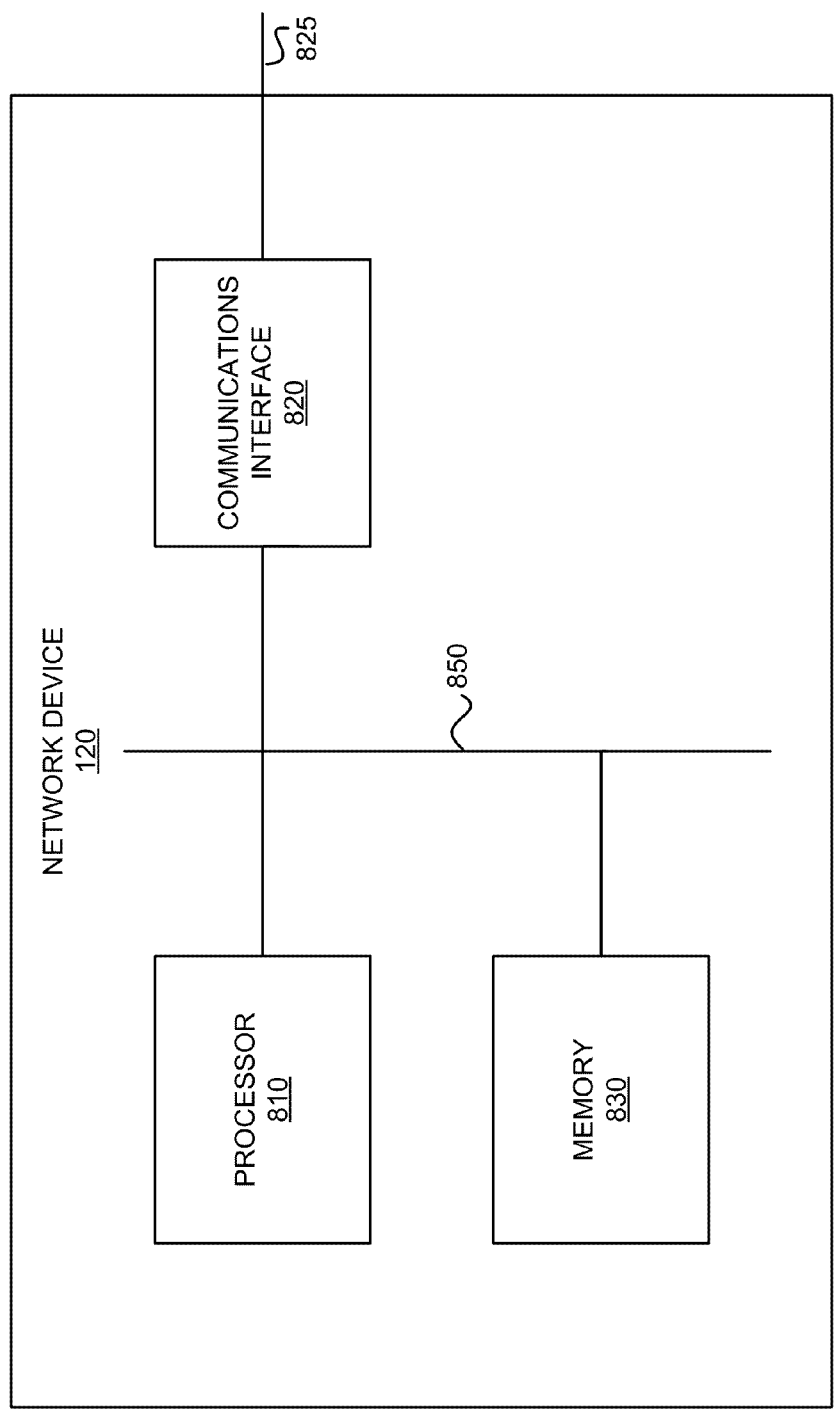
FIG. 8 is a block diagram of the network device in an exemplary implementation of the invention.

FIG. 8 illustrates a block diagram of the network device 120 in an exemplary implementation of the invention. The network device 140 may have a similar configuration as the network device 120. The network device 120 includes a processor 810, a communications interface 820, and a memory 830, which are all coupled to a system bus 850. The processor 810 is configured to execute executable instructions.

The communications interface 820 is coupled to the communication network 130 and the source 110 via the link 825. The communications interface 820 is configured to exchange communications between the source 110, the communication network 130, and the other elements in the network device 120. In some embodiments, the communications interface 820 may comprise a Local Area Network interface for the source 110 and a Wide Area Network interface for the communication network 130. The memory 830 is any memory configured to store data. Some examples of the memory 830 are storage devices, such as RAM, hard drives, optical drives, flash memory, and magnetic tape. As discussed above, the memory 830 may comprise two levels of memory. One level is a more temporary or short term memory such as RAM, and the other level is a more permanent or long term memory such as disk.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for matching data using flow based packet data storage, the system comprising:
    a communications interface that receives at least one data packet at a network device between a source and a destination, the at least one data packet including data and flow information; and
    a processor that:
        identifies a flow between the source and the destination based on the flow information in the at least one data packet;
        determines whether at least a portion of the data from the received at least one data packet indicates one or more potential matches to data in storage;
        retrieves a list of possible data matches;
        determines match sizes of the most likely data match and a second most likely data match by directly comparing packet bytes and matched data bytes; and
        stores the data from the at least one data packet without a packet header in a block of memory allocated for the flow, or
        generates a retrieve instruction for the data match depending on the match sizes.

2. The system of claim 1, wherein the processor moves the storage data between a fast memory and a slow memory.

3. The system of claim 1, wherein the flow comprises a session between the source and the destination.

4. The system of claim 1, wherein the processor allocates the block of the memory for the identified flow.

5. The system of claim 1, wherein the processor transmits the packet data.

6. The system of claim 1, wherein the block of memory allocated for the flow is allocated from a list of partially filled blocks of memory.

7. A method for matching data using flow based packet data storage, the method comprising:
    receiving at least one data packet at a network device between a source and a destination, the at least one data packet including data and flow information;
    identifying a flow between the source and the destination based on the flow information in of the at least one data packet;
    determining whether at least a portion of the data from the received at least one data packet indicates one or more potential matches to data in storage;
    retrieving a list of possible data matches;
    determining match sizes of the most likely data match and a second most likely data match by directly comparing packet bytes and matched data bytes; and
    storing the data from the at least one data packet without a packet header in a block of memory allocated for the flow, or
    generating a retrieve instruction for the data match depending on the match sizes.

8. The method of claim 7, further comprising moving the storage data between a fast memory and a slow memory.

9. The method of claim 7, wherein the flow comprises a session between the source and the destination.

10. The method of claim 7, further comprising allocating the block of the memory for the identified flow.

11. The method of claim 7, further comprising transmitting the packet data.

12. The method of claim 7, further comprising allocating the block of memory for the identified flow from a list of partially filled blocks of memory.

13. A software product for processing packets, the software product comprising:

software operational when executed by a processor to direct the processor to receive at least one data packet at a network device between a source and a destination, the at least one data packet including data and flow information; to identify a flow between the source and the destination based on the flow information in the at least one data packet; to determine whether at least a portion of the data from the received at least one data packet indicates one or more potential matches to data in storage; to retrieve a list of possible data matches; to determine match sizes of the most likely data match and a second most likely data match, by directly comparing packet bytes and matched data bytes; and to store the data from the at least one data packet without a packet header in a block of memory allocated for the flow, or to generate a retrieve instruction for the data match depending on the match sizes; and a non-transitory computer-readable storage medium configured to store the software.

14. The software product of claim 13, wherein the software is operational when executed by the processor to direct the processor to move the storage data between a fast memory and a slow memory.

15. The software product of claim 13, wherein the flow comprises a session between the source and the destination.

16. The software product of claim 13, wherein the software is operational when executed by the processor to direct the processor to allocate the block of the memory for the identified flow.

17. The software product of claim 13, wherein the software is operational when executed by the processor to direct the processor to transmit the packet data.

18. The software product of claim 13, wherein the block of memory allocated for the flow is allocated from a list of partially filled blocks of memory.

* * * * *